(12) United States Patent
Voegeli

(10) Patent No.: US 8,327,819 B2
(45) Date of Patent: Dec. 11, 2012

(54) CONSTANT VELOCITY ENGINE/TECHNOLOGY

(75) Inventor: Ronald C. Voegeli, Oak Harbor, WA (US)

(73) Assignee: CV Group, LLC, Sarasota, FL (US)

( * ) Notice: Subject to any disclaimer, the term of this patent is extended or adjusted under 35 U.S.C. 154(b) by 489 days.

(21) Appl. No.: 12/458,771

(22) Filed: Jul. 22, 2009

(65) Prior Publication Data
US 2011/0005480 A1    Jan. 13, 2011

Related U.S. Application Data

(60) Provisional application No. 61/129,840, filed on Jul. 23, 2008.

(51) Int. Cl.
*F02B 75/32* (2006.01)
(52) U.S. Cl. ............... 123/197.1; 123/197.3; 123/197.4
(58) Field of Classification Search ............ 123/197.1, 123/197.3, 197.4, 51 R
See application file for complete search history.

(56) References Cited

U.S. PATENT DOCUMENTS

| | | | |
|---|---|---|---|
| 3,731,662 A | | 5/1973 | Fandrich |
| 5,537,957 A | * | 7/1996 | Gutkin .................. 123/197.1 |
| 5,560,327 A | * | 10/1996 | Brackett .................. 123/55.7 |
| 5,622,142 A | * | 4/1997 | Strieber et al. ............ 123/45 A |
| 5,655,404 A | * | 8/1997 | Tsepenuk ................. 74/30 |
| 6,125,819 A | * | 10/2000 | Strieber et al. ............ 123/316 |
| 6,474,287 B2 | | 11/2002 | Babington |
| 6,510,831 B2 | | 1/2003 | Wiseman |
| 6,857,984 B2 | | 2/2005 | Imanishi et al. |
| 6,966,281 B1 | * | 11/2005 | Hale et al. ............ 123/46 SC |
| 6,981,483 B1 | * | 1/2006 | Keip ................... 123/197.1 |
| 7,201,133 B2 | * | 4/2007 | McKeown ............ 123/197.1 |
| 7,475,666 B2 | * | 1/2009 | Heimbecker .......... 123/197.1 |
| 2005/0051117 A1 | * | 3/2005 | Schmied ............... 123/48 R |
| 2005/0081805 A1 | * | 4/2005 | Novotny ............... 123/51 R |
| 2007/0215093 A1 | * | 9/2007 | Lemke et al. ........... 123/197.4 |

OTHER PUBLICATIONS

International Search Report and Written Opinion corresponding to PCT/US 2010/02057 issued on Sep. 20, 2010.

* cited by examiner

*Primary Examiner* — Noah Kamen
*Assistant Examiner* — Long T Tran
(74) *Attorney, Agent, or Firm* — Buchanan Ingersoll & Rooney PC

(57) ABSTRACT

Constant velocity internal combustion engines/designs capable of converting linear motion to rotary motion or rotary motion to linear motion include a gearshaft rather than a crankshaft, at least one pair of opposed and reciprocating pistons, and the gearshaft controlling the reciprocal linear translation of the pistons.

9 Claims, 21 Drawing Sheets

CONSTANT VELOCITY ENGINE/TECHNOLOGY

CROSS-REFERENCE TO PRIORITY/PROVISIONAL APPLICATION

This application claims priority under 35 U.S.C. §120 of U.S. Provisional Application No. 61/129,840, filed Jul. 23, 2008, hereby expressly incorporated by reference.

BACKGROUND OF THE INVENTION

1. Technical Field of the Invention

The present invention relates to unique constant velocity internal combustion engines/technology that convert linear motion to rotary motion or rotary motion to linear motion, designed to replace, e.g., all crankshaft combustion engines.

2. Description of Background and/or Related and/or Prior Art

The world today is being rapidly stripped of its natural resources. Global warming is melting glaciers causing water levels and its equilibriums to fluctuate with alarming consequence. Fossil fuel consumption continues to be in high demand despite cost per barrel which typically rises daily. These demands force oil companies to chart new untainted areas of the world in search for more fuel sources. The hunt for new oil deposits are being proven successful even today.

In the last 20 years, the population's awareness of the current environmental state of affairs has spawned an increase in the development of products specializing in efficiency for the world's ecological preservation. In an effort to become more efficient, many of these ideas, which are based upon existing technology, have been merely a band-aid of electronics that are cost prohibitive and limited for the consumer's long term efforts.

When one considers the resources the world is today expending for energy, transportation, recreation, from the date-to-day and to the luxurious, this is an industry worth billions of dollars. New technology can be the catalyst of great change, the maverick of a brand new green movement which can be of tremendous benefit to the world's resources, its inhabitants and those who pioneer this such venture.

Too, the benefits of the prototypical internal combustion engine have been tremendous. This engine is universally used in automobiles as well as in outboard motors, snowmobiles, personal water crafts, motorcycles, farm equipment, airplanes, stationary driven machinery, lawnmowers, chainsaws and other mechanical devices. The typical automobile uses a 4-stroke cycle with a variety of cylinders configurations which range from 3 cylinders up to 12. The smaller crafts and equipments use a 2-stroke cycle and utilize 1 cylinder up to 4 cylinders. These engines are time proven and tested and can be manufactured with mechanical confidence. But with environmental concerns of pollution as well as the inevitable long term shortage of fossil fuel and the rising cost factor, the negative future outcome and response by the general public outweighs the short term benefits.

And the conventional 4-stroke engine is a more complex engine than the 2-stroke engine, thus making the 4-stroke heavier in weight and costlier to manufacture. The 2-stroke engine, having fewer parts and complexities, is lighter and less expensive to manufacture than the 4-stroke. The 2-stroke engine has been able to achieve greater horsepower per cubic inch than the 4-stroke engine, but due to higher polluting emissions, the 2-stroke has a much greater impact of damage to the environment.

SUMMARY OF THE INVENTION

The present invention features constant velocity engines/technology considered to eventually replace all crankshaft combustion engines. Other applications that convert linear motion to rotary motion or rotary motion to linear motion are also provided.

Two major components of the constant velocity design are the moving parts (assemblies) (FIG. 1):

A: In place of the crankshaft is a gearshaft. The gearshaft incorporates a series of teeth arranged around the diameter, creating the connection for the majority of the stroke in each direction. In each opposing direction of stroke, the teeth are offset allowing the engagement in one direction and non-engagement in the opposite. A cam groove is in between the sets of teeth, this groove allows for ramp up and ramp down creating a reversing point between each stroke. This allows for total engagement throughout the stroke and the reversing stroke. The ramp up creates perfect alignment with the teeth while providing additional strength at the highest concentration of force caused by combustion and stroke turn around. Restated, the rampdown provides controlled deceleration to zero and the rampup provides controlled alignment for the reverse stroke.

B: A rodrack assembly is the rigidly connected components of opposing pistons, linkrods, turning cams, and rodrack (see FIG. 2). The pistons are comprised of four parts—piston top, bottom, ring, and pin (see FIG. 3). When assembled to the linkrod, the unit becomes rigid, as if made of one piece. The rodrack has two sets of teeth positioned at an offset from each side of the centerline of the linkrods allowing for the engagement with the gearshaft (see FIG. 2). Each end of the rodrack connects to the linkrods using the turning cam axle. This is also rigidly attached as if made of one piece. The top and bottom of the rodrack have machined parallel surfaces which fit into bearings which are mounted to the case. This provides for a precise linear movement of the rodrack assembly. The piston assemblies are mounted to the rodrack in a collinear position. The precise linear movement of the rodrack assembly maintains the pistons in the center of the cylinder in a collinear axis. The rigid assembly is possible because there are no unbalanced or eccentric loads.

In all subsequent figures, the constant velocity engine displayed is the 90° version. Excluded from all displays are cylinder head, coolant system, lubrication system, fuel system, and air/fuel induction system. Some objects/parts of the figures are translucent allowing for better observation of items/details otherwise invisible.

DETAILED DESCRIPTION OF BEST MODE AND SPECIFIC/PREFERRED EMBODIMENTS OF THE INVENTION

Figure 1:
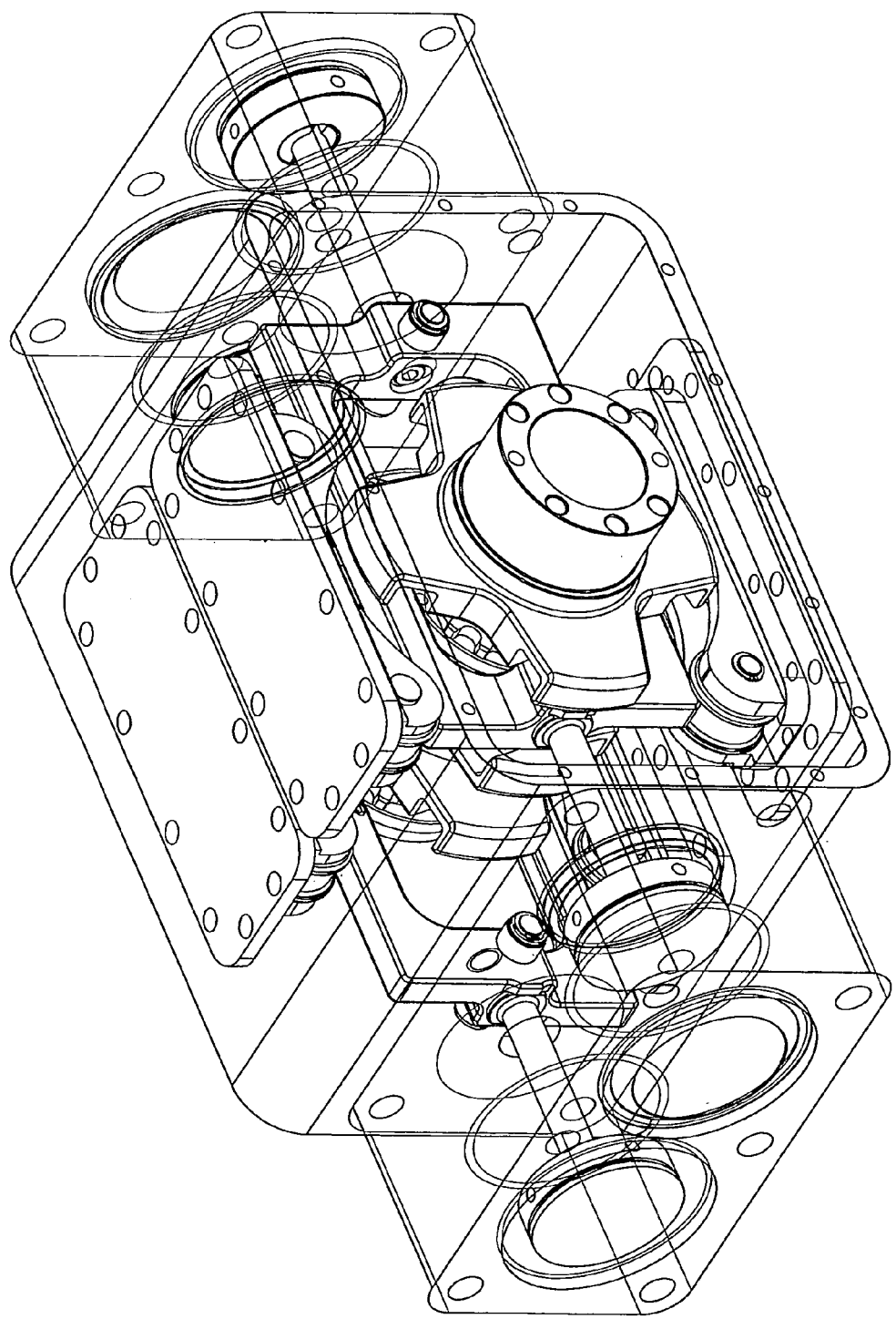
FIG. 1 is a perspective view of a constant velocity engine according to the invention, with the inner workings displayed.

In FIG. 1 the constant velocity technology is shown with the inner workings displayed. The ideal engine would be comprised of two rodrack assemblies providing four cylinders (pistons). The linear direction of each rodrack would be opposite the other, this would help eliminate or counter balance each others reciprocal forces.

Figure 2:
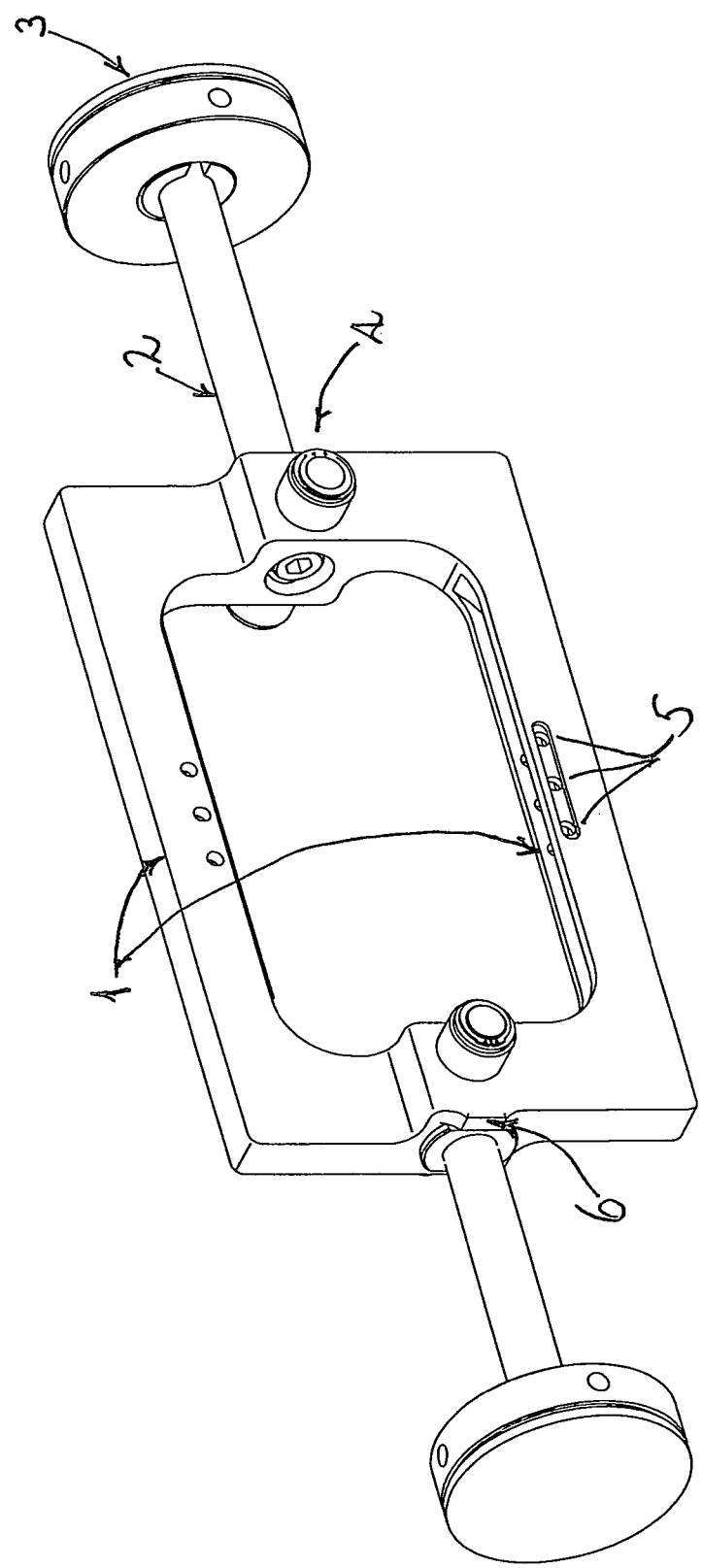
FIG. 2 is a perspective view of the rodrack assembly as a complete and rigid unit.

The rodrack assembly is shown as a complete and rigid unit in FIG. 2, wherein numeral 1 indicates the rodrack with offset rails providing teeth engagement and roller beams. Numeral 2 show a linkrod, 3 a piston, 4 engagement guide bearings, 5 teeth engagement rollers and 6, an inter-locking flat tab.

Figure 3:
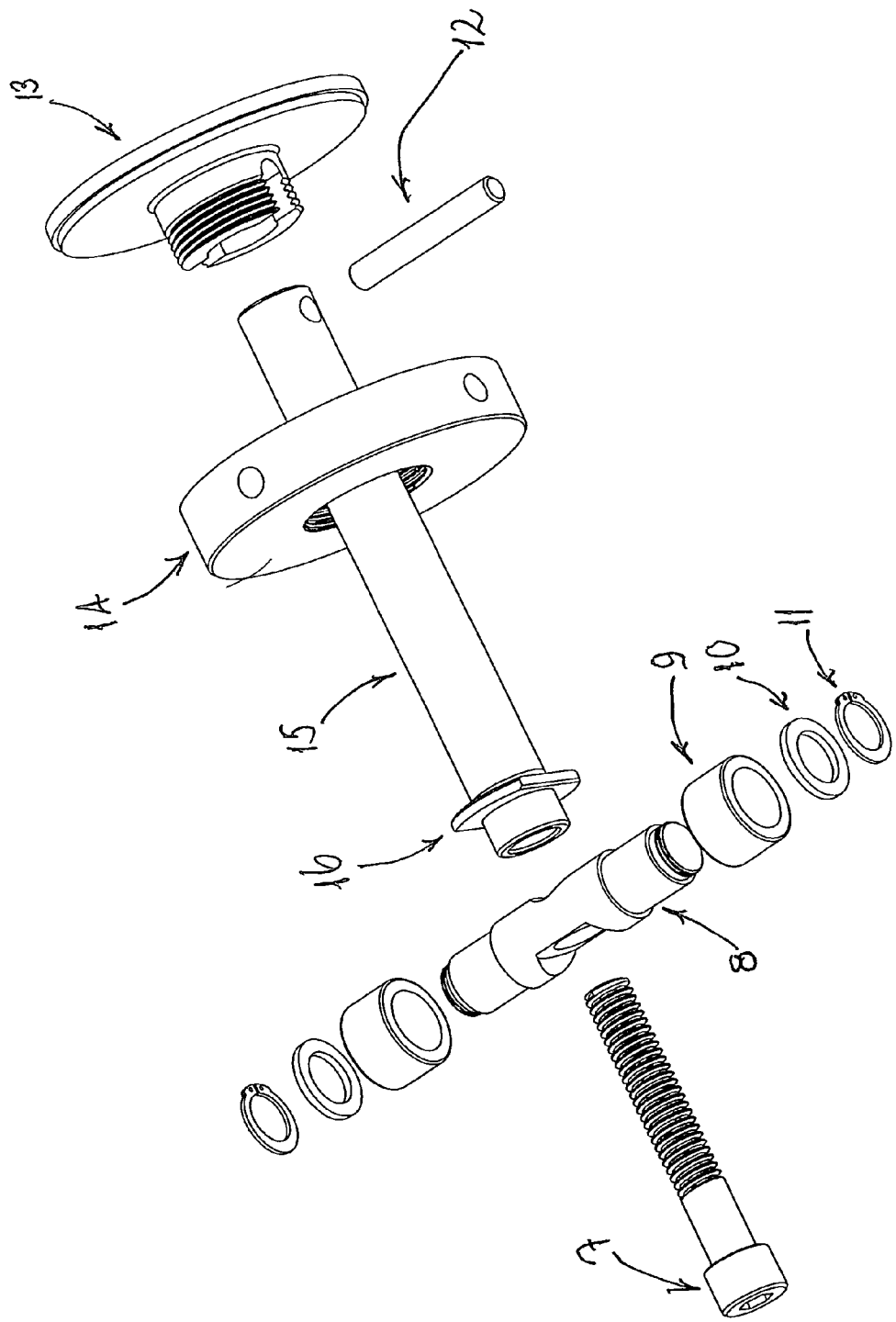
FIG. 3 is a perspective view of a piston linkrod exploded assembly.

The piston linkrod exploded assembly is shown in detail in FIG. 3. In FIG. 3, numeral 7 shows a linkrod assembly attach, 8 an engagement guide shaft, 9 an engagement guide roller, 10 and 11, also engagement guide rollers, 12 a piston lock, 13 a piston top, 14 a piston bottom, 15 a linkrod and 16, an inter-locking flat spot. In this Figure, the compression ring is not shown. The piston top fits snugly onto the linkrod with the piston lock pin preventing rotational movement. The piston bottom is threaded onto the piston sandwiching the piston lock pin providing a solid and rigid attachment. The engagement guide shaft is inserted into the rodrack as the linkrod assembly bolt is inserted through the engagement guide shaft and threaded into the linkrod. The linkrod flat side is mated to the tab on the rodrack preventing rotation. When tightened, the rodrack (not shown) is sandwiched between the linkrod and the engagement guide shaft providing solid attachment.

Since the piston does not use the walls of the cylinder to guide its movement, the piston can have precise clearance and it is possible for the ring to be continuous for better sealing. With the piston designed in two pieces (top and bottom); it is possible to install a continuous ring. With the use of certain of the advanced materials now available, it is highly likely the ring could be designed with minimal clearance while maintaining sufficient clearance throughout the range of temperatures generated during combustion.

Figure 4:
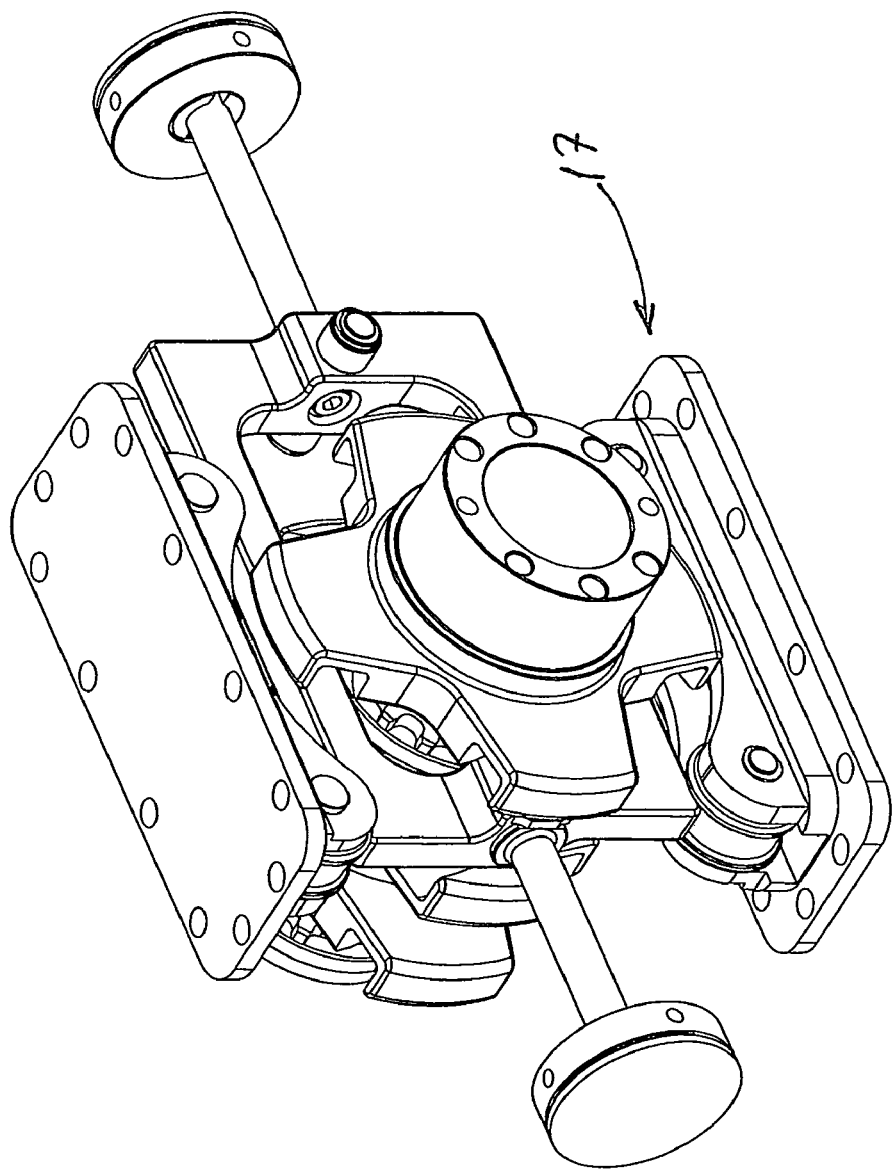
FIG. 4 is a perspective view of a rodrack assembly showing rack roller assemblies and gearshaft.

The rodrack assembly with rack roller assemblies and gearshaft are shown in FIG. 4, which illustrates a roller-guide housing assembly. The four rollers shown in this view confirm the true and precise linear movement of the constant velocity technology.

Figure 5:
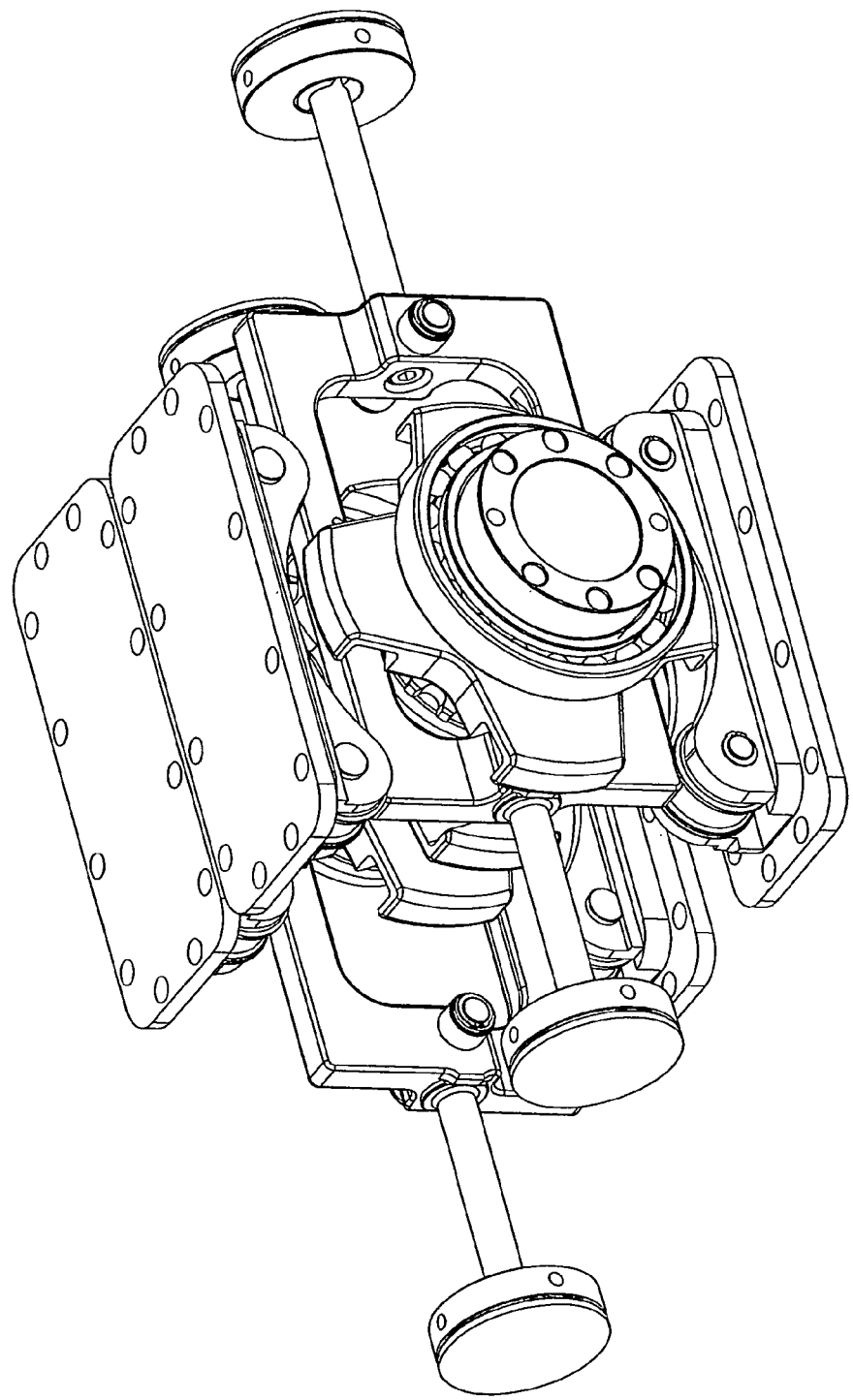
FIG. 5 is a perspective view of both rodrack assemblies with their respective rack roller assemblies and gearshaft.

In FIG. 5, both rodrack assemblies with their respective rack roller assemblies and gearshaft are shown. Note the opposed or alternating movement of each rodrack assembly in this view.

Figure 6:
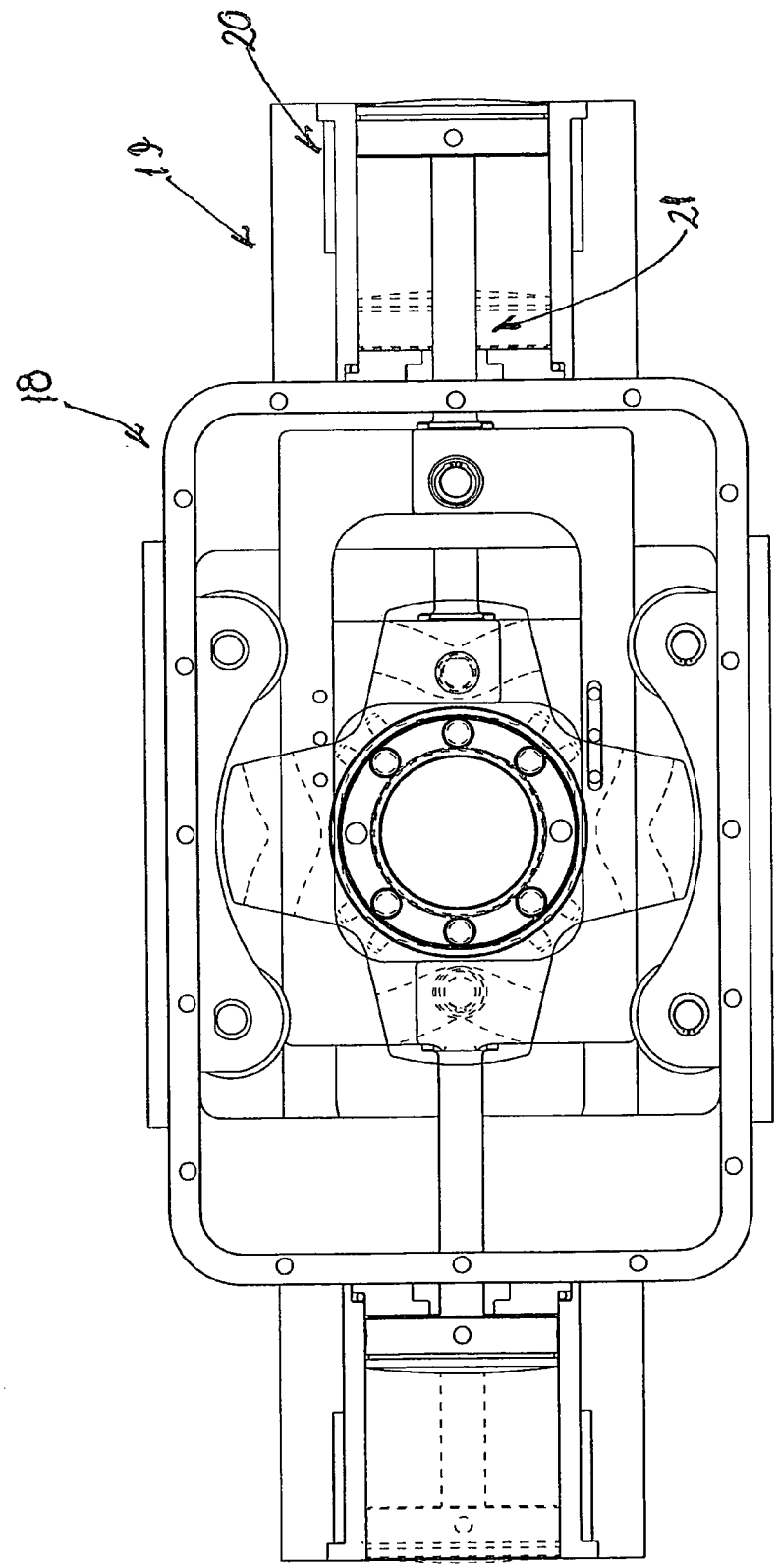
FIG. 6 is a front view of a constant velocity engine assembly, showing both front and rear rodrack assemblies.

In FIG. 6, the front view of the constant velocity engine assembly with both the front and rear rodrack assemblies are shown. The forward rodrack assembly is shown at top-dead-center (TDC) to the right and bottom-dead-center (BDC) to the left, putting the rear rodrack assembly opposite that of the front rodrack assembly at TDC to the left and BDC to the right.

Figure 7:
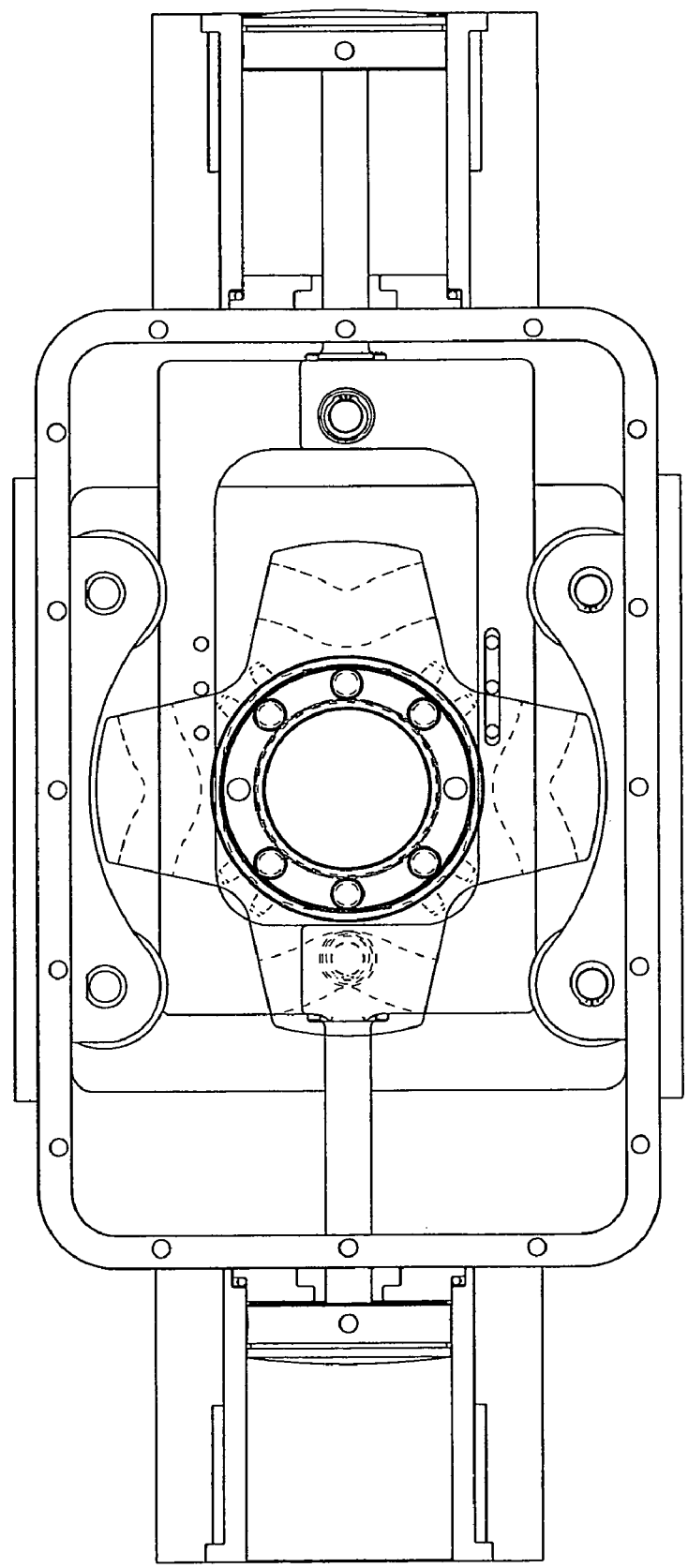
FIG. 7 is a front view of the constant velocity engine assembly with the rear rodrack assembly omitted.

In FIG. 7, the front view of the constant velocity engine assembly has the rear rodrack assembly omitted. FIG. 7 shows a case 18, cylinder block 19, cylinder liner 20 and linkrod seal 21. The right piston is at TDC and the left piston at BDC. Since the linkrod moves in a precise linear movement, it is possible to install a linkrod seal creating a unique chamber at the bottom side of the piston. This chamber could aid in the air or air/fuel mixture induction. In the 90° version, any valve operation would operate directly off lobes on the gearshaft eliminating the need for a camshaft.

In a two cycle design, air or air/fuel mixture would be inducted into the chamber at the back side of the piston and ported into the lower portion of the cylinder on the top side of the piston as the valves would open in the head, expelling the exhaust. The linkrod seal at the bottom of the chamber under the piston also becomes a seal maintaining the lubrication in the midsection of the unit and keeping the lubrication out of the fuel induction area. The four stroke version may not require the seals on the bottom side of the pistons. The air or air/fuel mixture and exhaust would traverse through intake and exhaust valves in the head. An important feature is the ability to use both sides of the piston.

Figure 8:
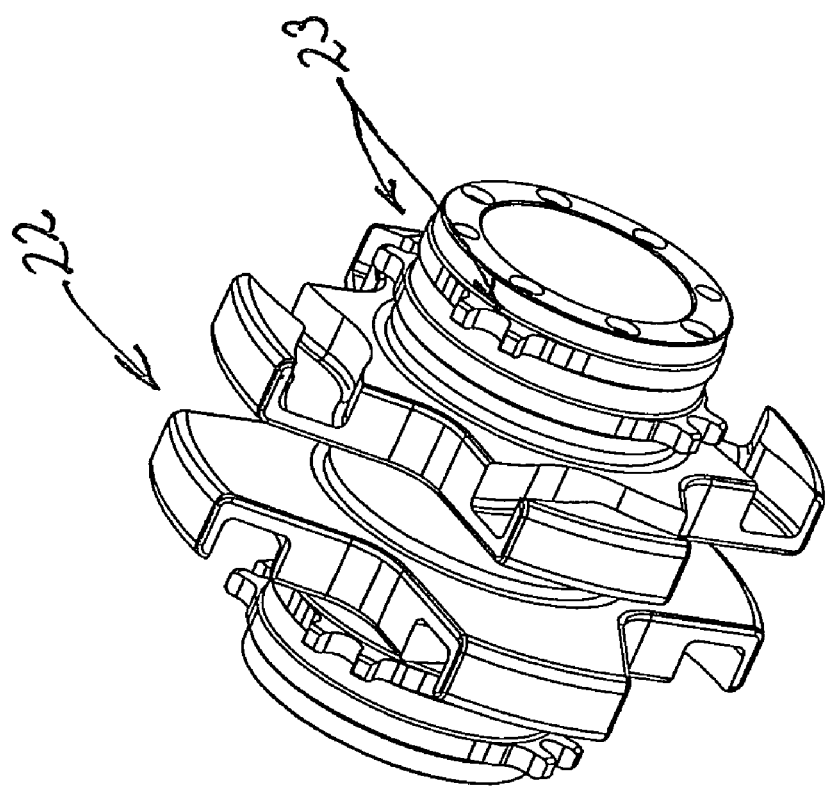
FIG. 8 is a perspective view of the main section of a gearshaft.
Figure 9:
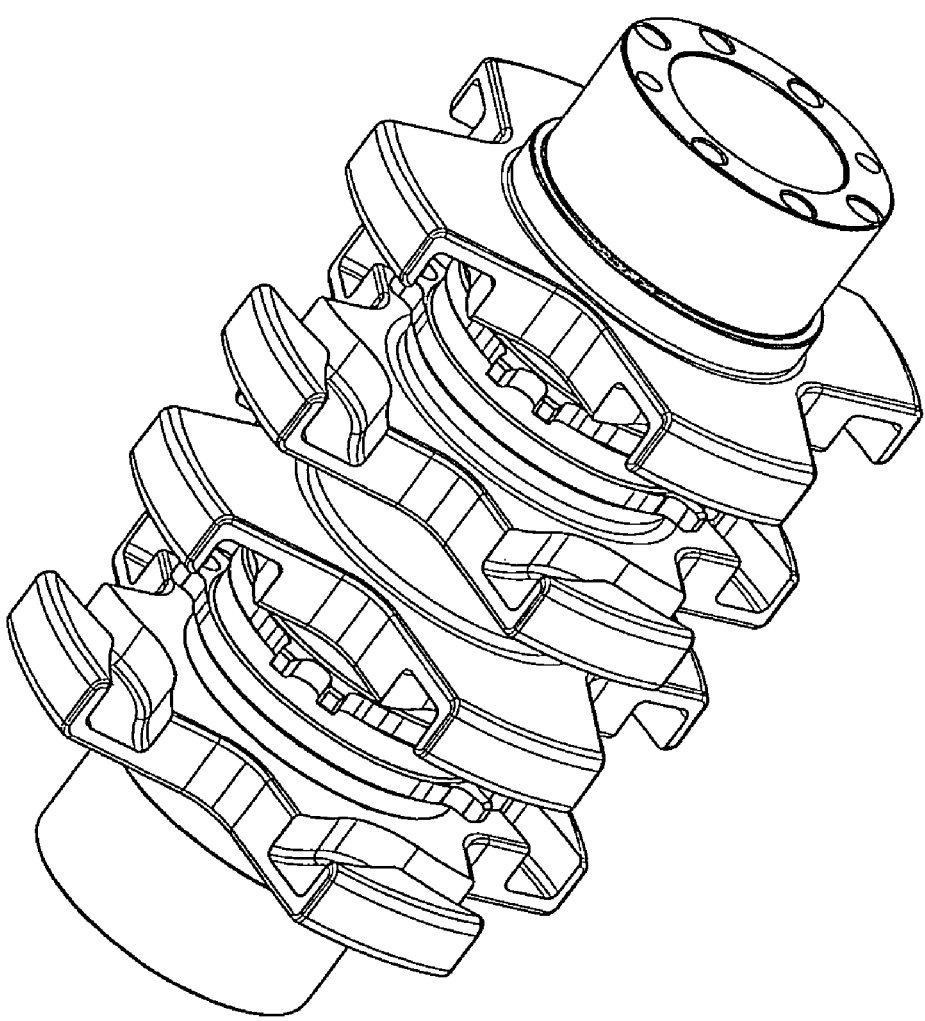
FIG. 9 is a perspective view of the main section of a gearshaft, showing end sections thereof.

FIG. 8 shows a reversing engagement groove 22 and engaging teeth 23.

Figure 10:
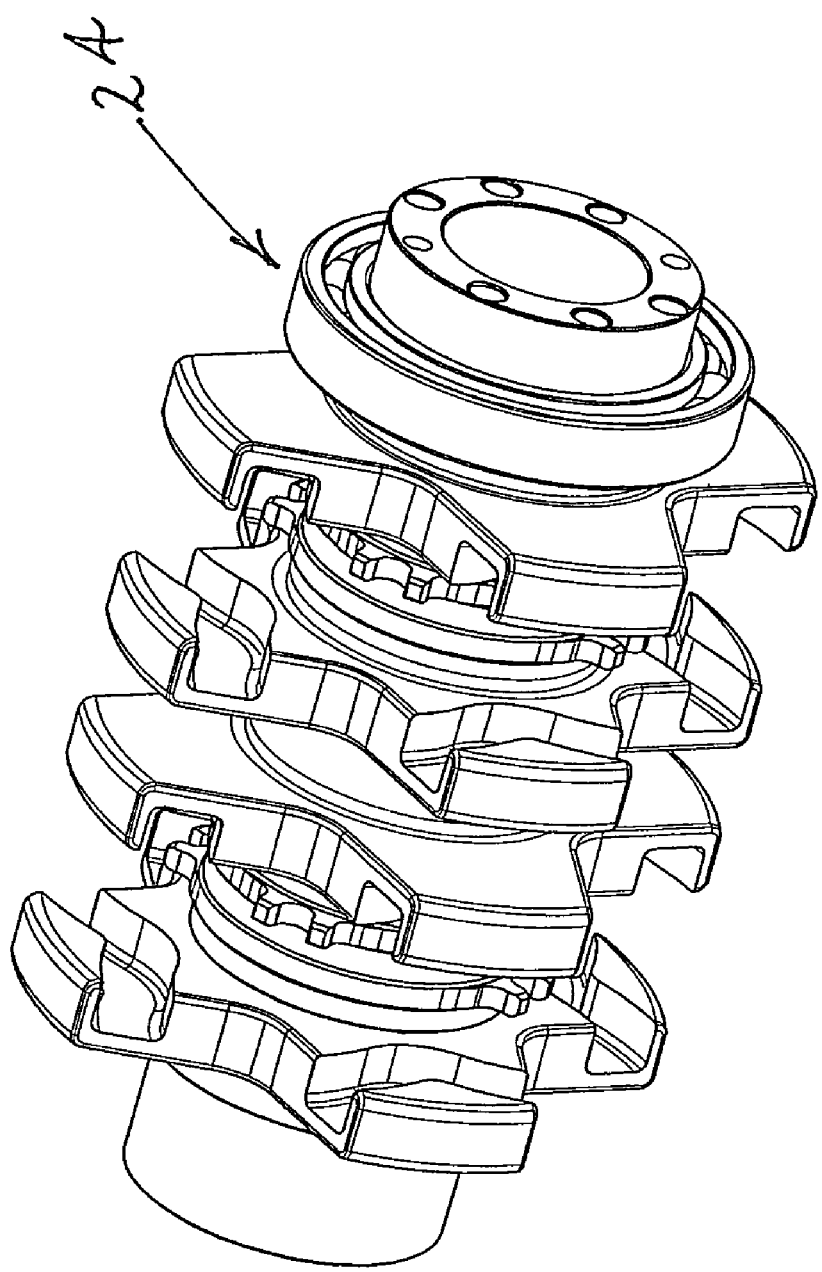
FIG. 10 is a perspective view of the main section of a gearshaft, showing end sections and front shaft bearing.

In FIG. 10, the gearshaft main section is shown with end sections and front shaft bearing 24. The opposite end would have the same shaft bearing.

Figure 11:
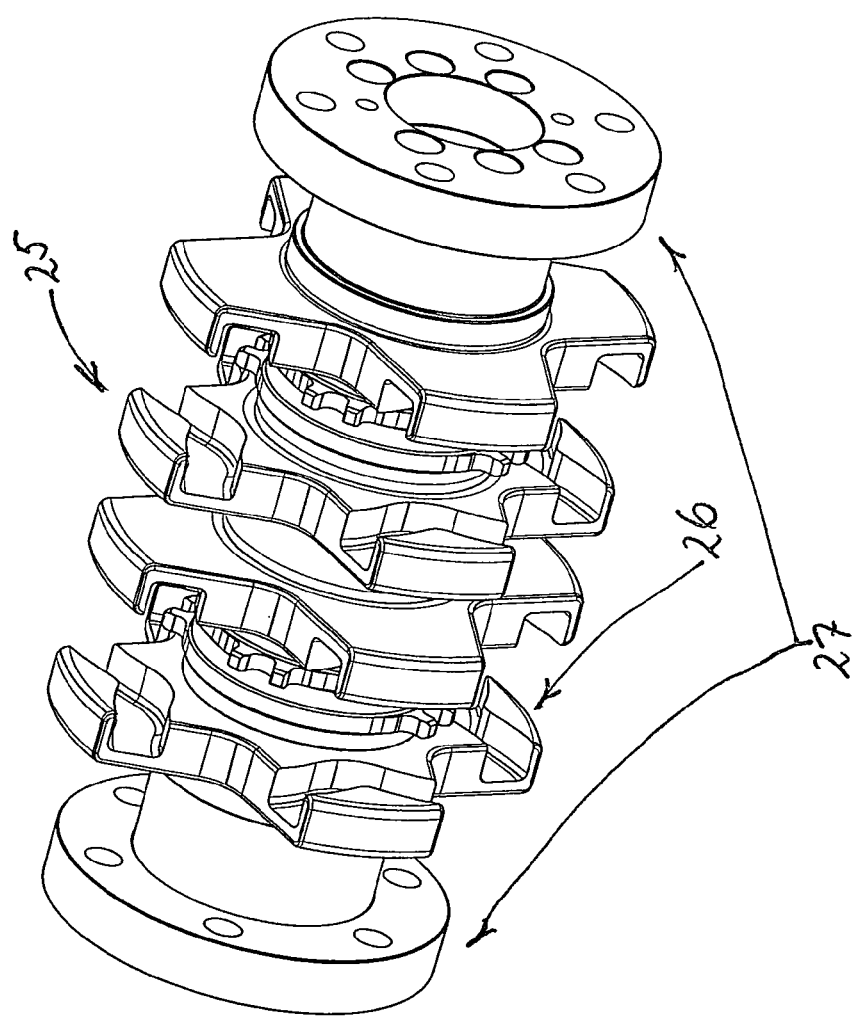
FIG. 11 is a perspective view of the main section of a gearshaft assembly, showing end sections and shaft flanges.

In FIG. 11, the gearshaft main section 25 with end sections 26 and shaft flanges 27 are shown. Apparent in this view, the gearshaft is concentric eliminating the need to create counter weights to maintain rotational balance. The sizeable hole shown in the center of the gearshaft is also of notable advantage. This hole provides for the use of a common shaft directly in the center line of the unit allowing for the coupling and/or uncoupling of multiple units.

Figure 12:
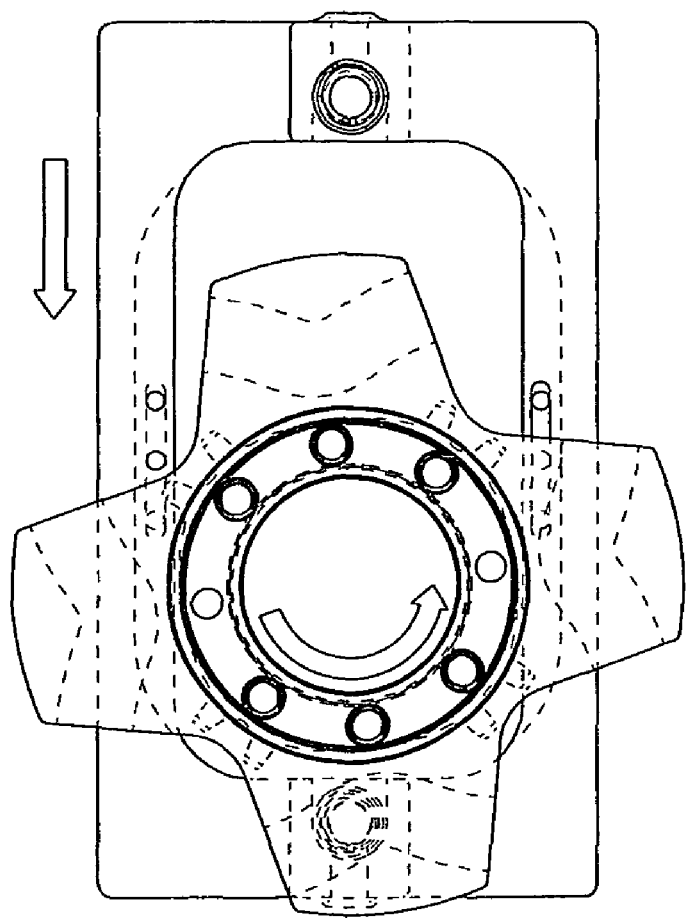
FIG. 12 is a side view showing movement of the rodrack from top-dead-center.

In FIG. 12, which shows the direction of rodrack movement, the rodrack has moved 0.100" from TDC rotating the gearshaft from 0° to 8°. This 8° on each side of TDC is used to ramp down for reversing of the rodrack assembly and ramp up for precisely aligning the rodrack with the gearshaft.

Figure 13:
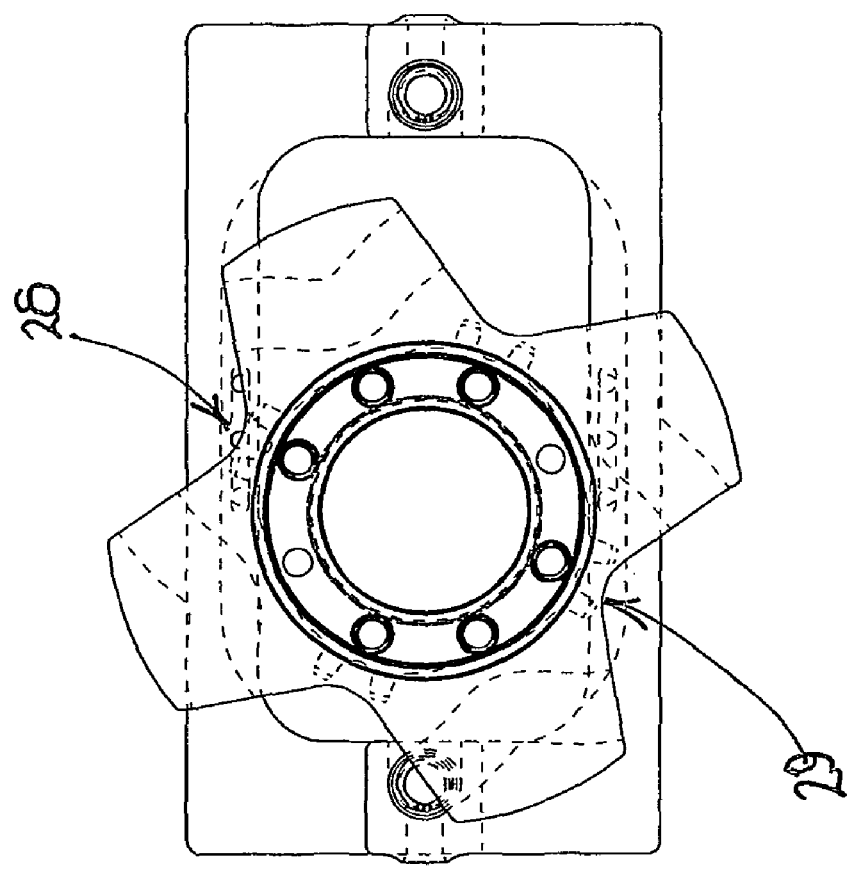
FIG. 13 is also a side view showing movement of the rodrack from top-dead-center.

In FIG. 13, which shows engagement 28 of multiple teeth acquired and offset teeth not engaged 29, the rodrack has moved 0.500" from TDC rotating the gearshaft from 0° to 22°. Subtracting the previous 8° of rotation gives 14° of rotation, moving the rodrack at the exact speed/ratio as when the teeth are in mesh. This additional 14° of rotation and movement of rodrack assembly assures the complete and precise engagement of two teeth before exiting the cam groove. This cam groove which is on each side and each end of the rodrack assembly provides the strength for reversal where it is most needed.

Figure 14:
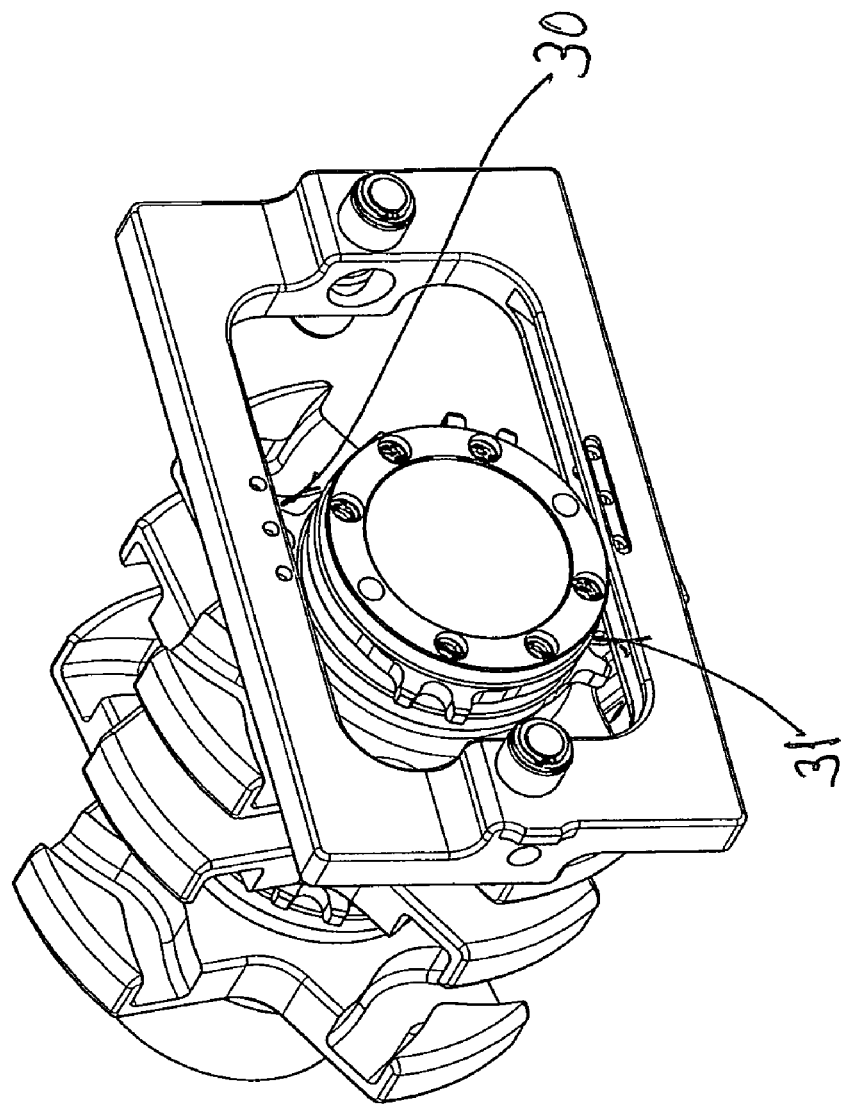
FIG. 14 is a perspective view of the rodrack moved from top-dead-center.

In FIG. 14, which shows engagement of multiple teeth acquired 30 and offset teeth not engaged 31, the rodrack shown has moved 0.500 from TDC rotating gearshaft from 0° to 22°. When the end sections of the gearshaft are removed and viewed at an angle, the engagement of gearshaft teeth and offset of opposite gearshaft teeth are apparent.

Figure 15:
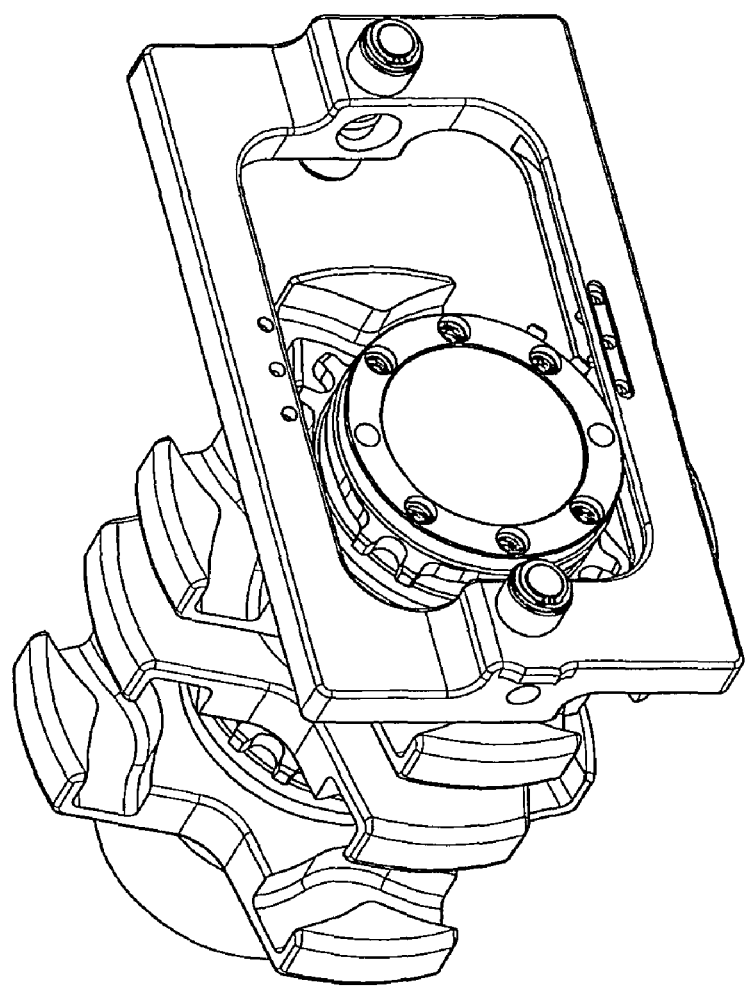
FIG. 15 is a perspective view of the rodrack with end sections of gearshift removed at an angle showing offset of teeth.
Figure 16:
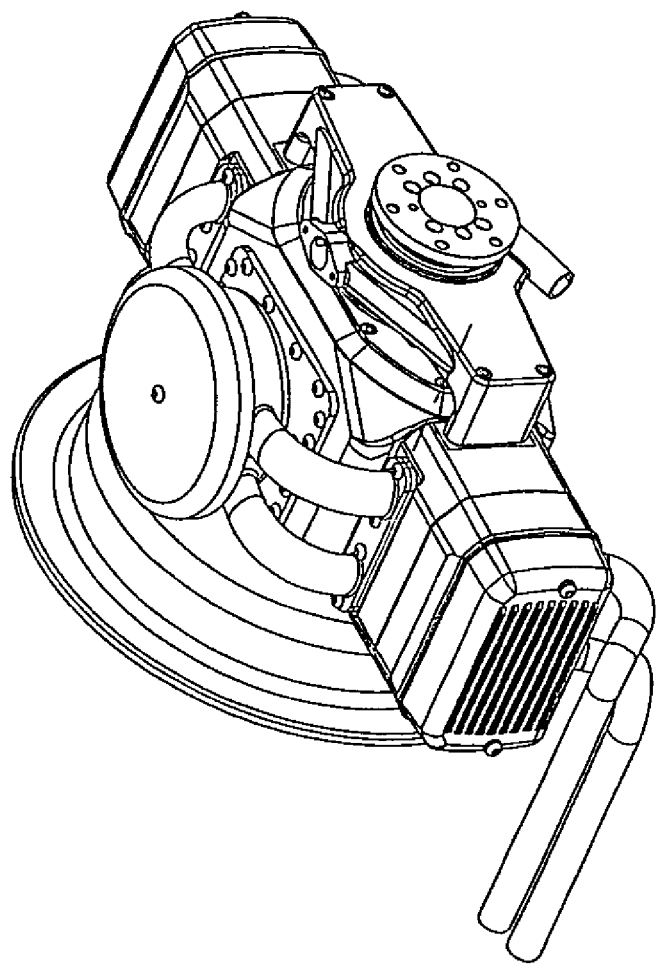
FIGS. 16 and 17 are perspective views of a complete constant velocity internal combustion engine in a diesel fuel configuration, FIG. 16 in front to right view, and FIG. 17 in front to left view.
Figure 17:
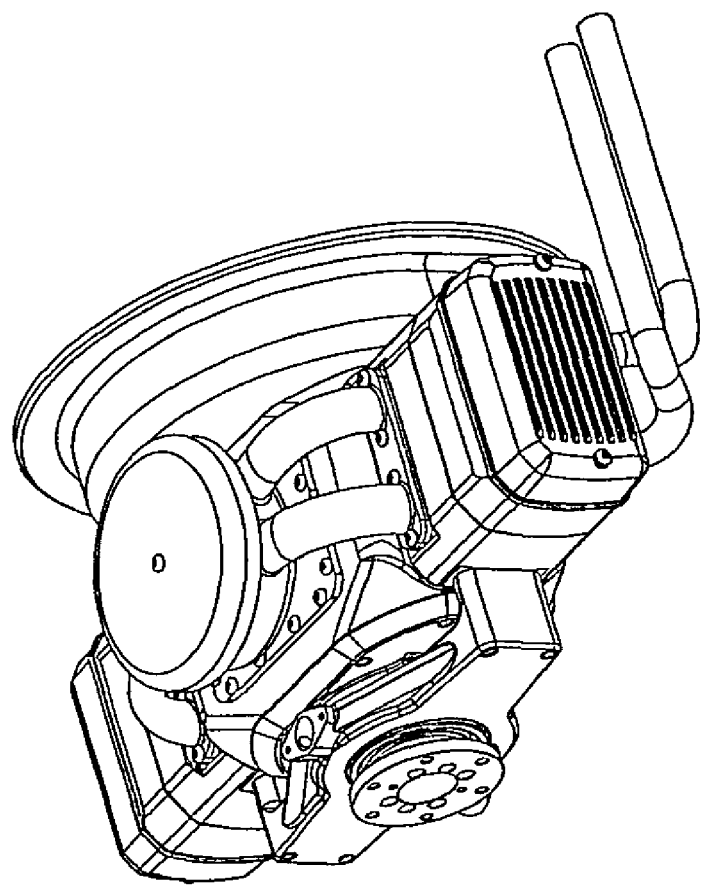
Figure 18:
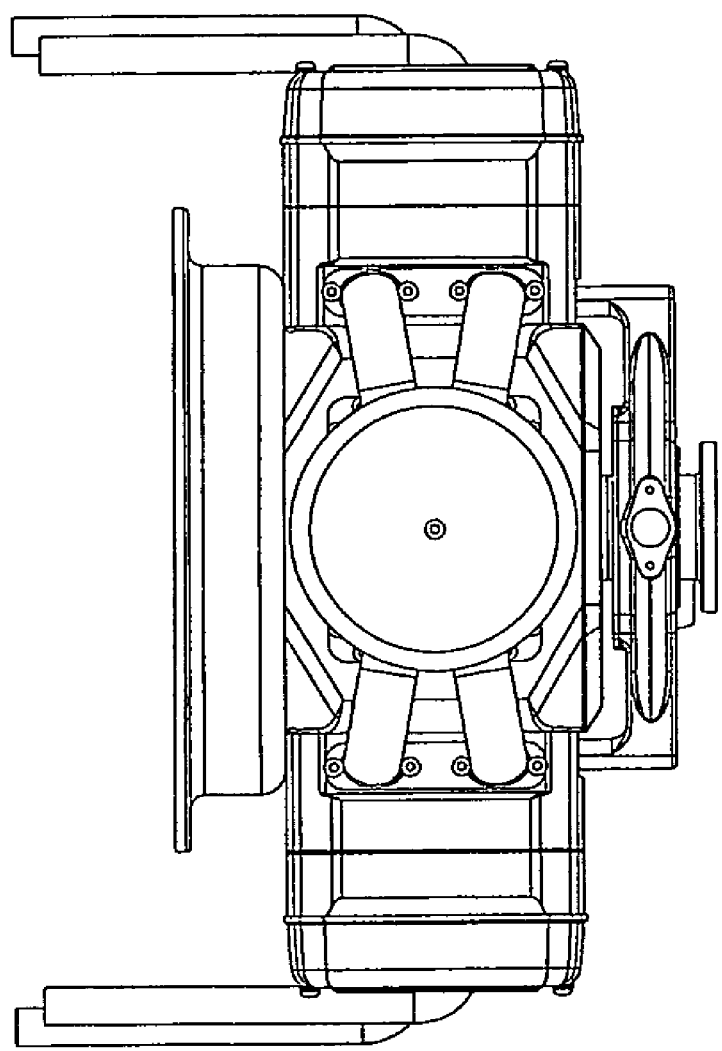
FIGS. 18 and 19 are top and front views, respectively, of a complete constant velocity internal combustion engine according to the invention.
Figure 19:
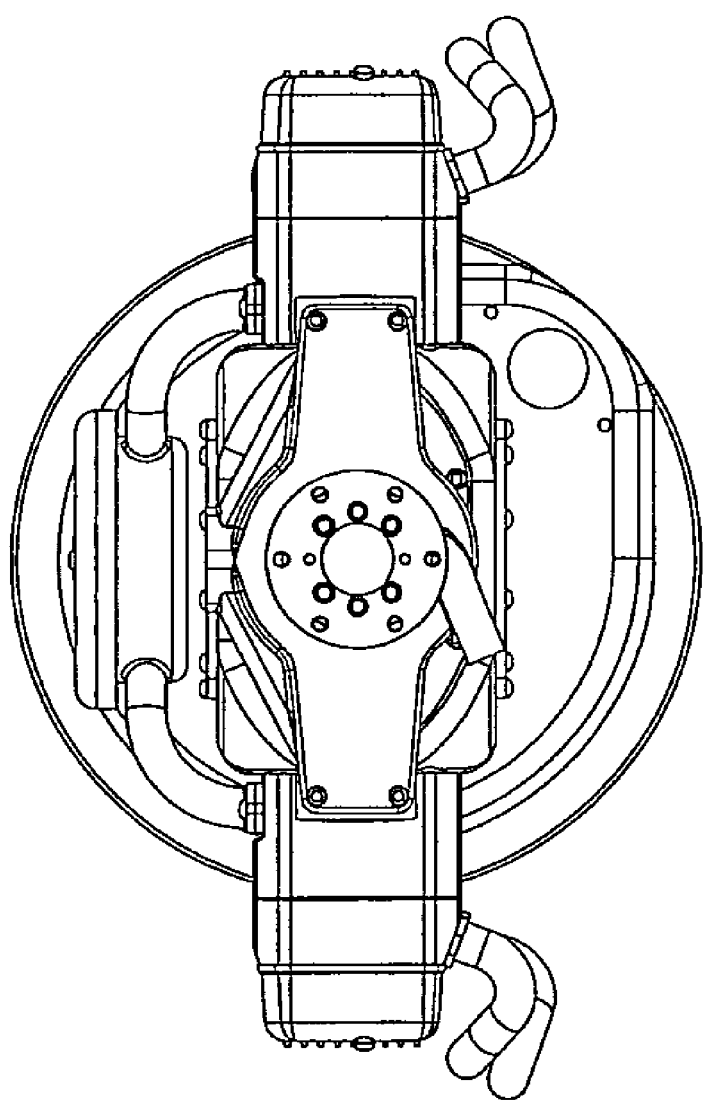

In FIG. 15, the rodrack is shown at TDC and gearshaft at 0° with end sections of gearshaft removed at angle showing offset of teeth.

The constant velocity technology achieves minimum friction. As stated previously, the design inherently reduces friction in the piston area. In addition, the engagement teeth on the gearshaft engaging into the rodrack have also been designed to minimize friction as well. It is possible to design the action between the gearshaft and the rodrack with a more conventional means such as rack and pinion style gearing. This gearing could be either straight or helical cut style teeth. The concept of the teeth on the gearshaft resembling a sprocket and the reception into the rodrack resembling a roller chain will conceivably create less friction than the use of gear style teeth. If the need for increased strength is necessary, several rows of teeth on the gearshaft and matching rows of rollers could be incorporated in the design, greatly increasing the strength.

FIGS. 16, 17, 18 and 19 are rendered drawings of a complete constant velocity internal combustion engine in a diesel fuel configuration. Its characteristics are as follows:

DESCRIPTION

Configuration: Modified 2-stroke; Naturally Aspirated
Number of cylinders: 4
Displacement: 593 CC
Estimated Horsepower: 230 @2200 rpm with diesel fuel (260 @ 3500 rpm with gasoline)
Estimated weight: 85 lbs
Dimensions:
Width—Overall (outside of exhaust pipes) 27¼" (excluding exhaust pipes) 24½"
Height—Overall (including air induction) 11⅝" (excluding air induction) 7½"
Length—Overall (excluding bell housing and gearshaft end) 11"

Depending on the constant velocity engine's changeable bore to stroke and stroke to rotation, as stated earlier, over twice as much torque to combustion versus the crankshaft engine is realized. Another design advantage of the constant velocity technology is less friction produced. One can deduce that less heat will be generated in the constant velocity engine because of the minimized friction. With less friction and less heat, the resulting advantage will also increase power and emit less environmental pollutants.

When comparing the conventional crankshaft engine with the constant velocity engine, both of equal displacement, the overall dimensions and configuration of the constant velocity engine are considerably smaller. The constant velocity design is very low in height and is compact in length; the width is similar to that of the conventional crankshaft engine but is generally less. The total results relate to less weight. Less weight means less expense to manufacture the moving vehicle and more economy in operating the mechanism thus achieving a greater advantage over the current conventional technology. When designed with the half speed shaft rotation, the torque is much greater and the transmission to the drive wheel ratio is decreased. The wheel speed to engine shaft rotation speed is decreased or closer to an even ratio than the conventional engine. Again, the constant velocity design creates more economical value for the overall vehicle.

Thus, the benefits of the constant velocity engine as compared to the crankshaft engine are as follows:

Better Fuel Economy—the fuel economy is from four sources. The first is the reduced internal friction because of the linear piston motion with no angular force vectors. The second is the linear transfer of power by the piston to the lever transferring rotation to the gearshaft. The third is the constant torque transferred to the power output by the fixed lever length. The fourth is the reduction in size and weight for the equivalent required horsepower, thereby reducing the other associated weights to support the engine and workload.

Lower Operating Cost—the lower cost is from greater fuel mileage and the elimination of oil changes and oil filter.

Hollow Gearshaft—having a hollow shaft with sufficient size to allow a common drive shaft to pass through the gearshaft at the centerline, provides the ability to stack multiple engines along a common shaft. This unique feature offers the ability to engage and disengage engines as desired. This can be instrumental to provide the engine(s) better economy, longer life and flexible redundancy. This feature will be extremely valuable in the aeronautical industry and heavily loaded transportation vehicles allowing adjustable power levels and the ability to function with an engine malfunction.

Lower RPM with Higher Torque—the lower rpm of the constant velocity engine has benefits for reduced wear and longer life for the engine and all associated drive components such as the transmission, gear reducers and differential.

Lighter Weight—Estimates for the constant velocity engine are on the order of half the weight for equivalent horsepower. Even greater weight savings can be expected. The weight reduction comes from elimination of the crankshaft, less moving parts, lighter construction because of the reduced stresses and heat and the ability to double up opposing pistons at the same contact point with the gear shaft. However, the engine is lighter mostly because of the inherent ability to achieve comparable horsepower with greater torque in a smaller displacement engine.

Lower Engine Life—longer life is the result of linear forces, lower friction, lower heat, less moving parts, ability to use new materials and improved lubrication.

Lower Heat of Operation—the linear piston travel, with no side forces, does not load the cylinder sidewalls. It is possible that the case (block) may not need any cooling which will make the constant velocity engine even lighter and more simpler.

Uniform Torque Deliver—the constant velocity engine delivers a smooth and uniform torque except for a very small portion of its power stroke. This can easily be mitigated, if needed, with timing of the multiple cylinders. The very efficient torque delivery, linear piston force vector and the absence of non-linear forces are the major reasons for the boost in horsepower for an equivalent engine size.

No Oil in Fuel for 2-Stroke—the frictionless piston will require no lubrication of the piston/combustion area. This will increase horsepower while reducing pollution and operating cost.

Wide Range of Stroke Lengths—the constant velocity engine stroke is not limited to greater than twice the throw of the crankshaft journal and may be shorter or longer.

Wide Range of Strokes per Gear Shaft Revolution—the number of piston strokes per gear shaft revolution is only limited by practicality. The strokes may be any even number plus the number 1 and some fractions.

Unique Lower Piston Chamber—the linear piston travel which allows the case to be sealed and separated from the piston motion, making it possible to have a lower functional piston which may be used as a turbo charger and/or fuel mixing stage.

Figure 20:
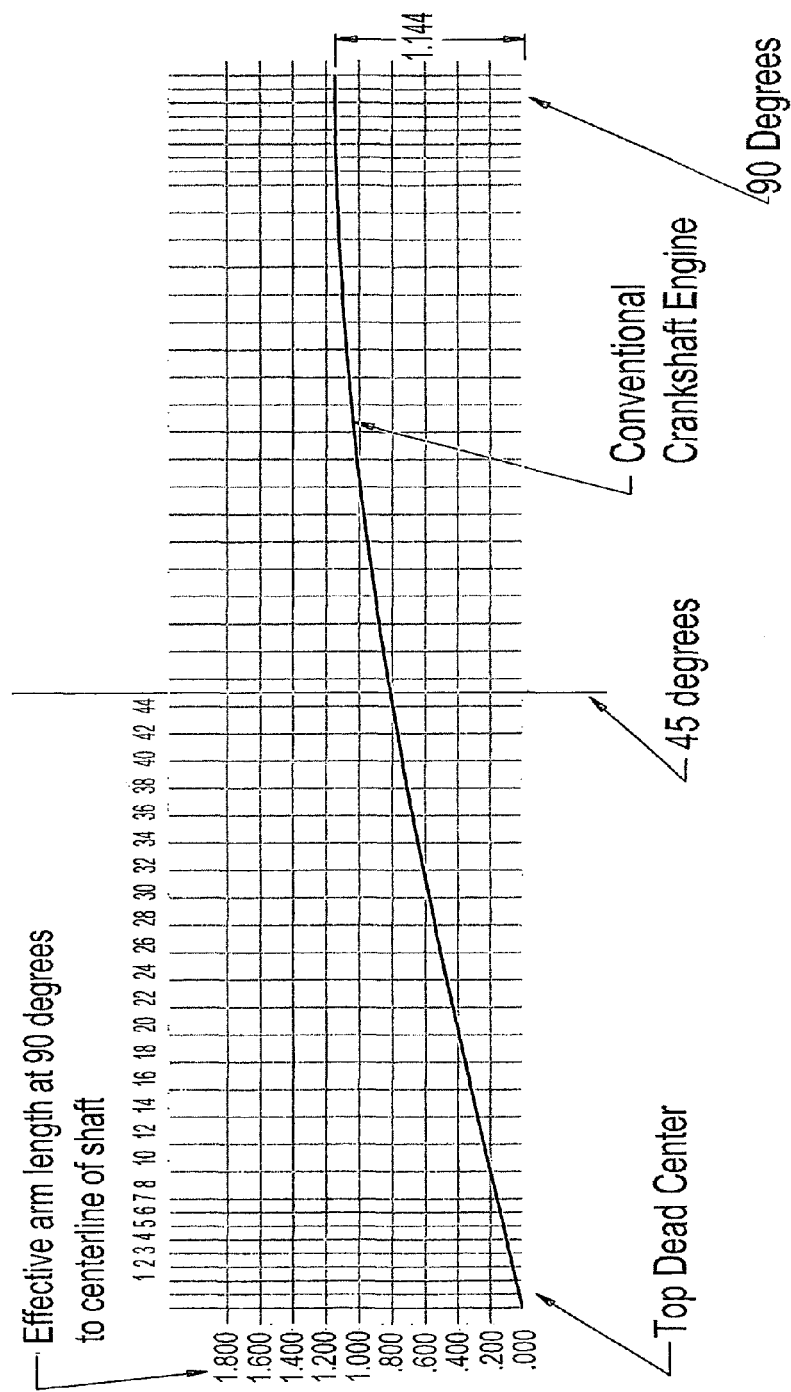
FIGS. 20 and 21 are graphs comparing the torque of conventional internal combustion engines versus that according to the present invention.

To reiterate, one advantage of the constant velocity concept is the increased power produced because of the mechanical advantage directly related to the design. The graph in FIG. 20 shows the conventional internal combustion engine starting at top-dead-center (TDC), where the piston is furthest away from the centerline of the crankshaft which is the least advantage of torque to 90 degrees of rotation which is the greatest advantage of torque.

Conventional crankshaft engine average lever arm length at 90 degrees to centerline of force=0.741*=64.8% of maximum lever arm length of 1.144*. At 180 degrees of shaft rotation at 100 lbs of linear force to piston=average torque of 74.1 in lbs of torque there will be loss of torque due to piston to cylinder friction incurred from connecting rod angular pressures. This friction increases as force increases and resistance of shaft rotation is incurred.

Figure 21:
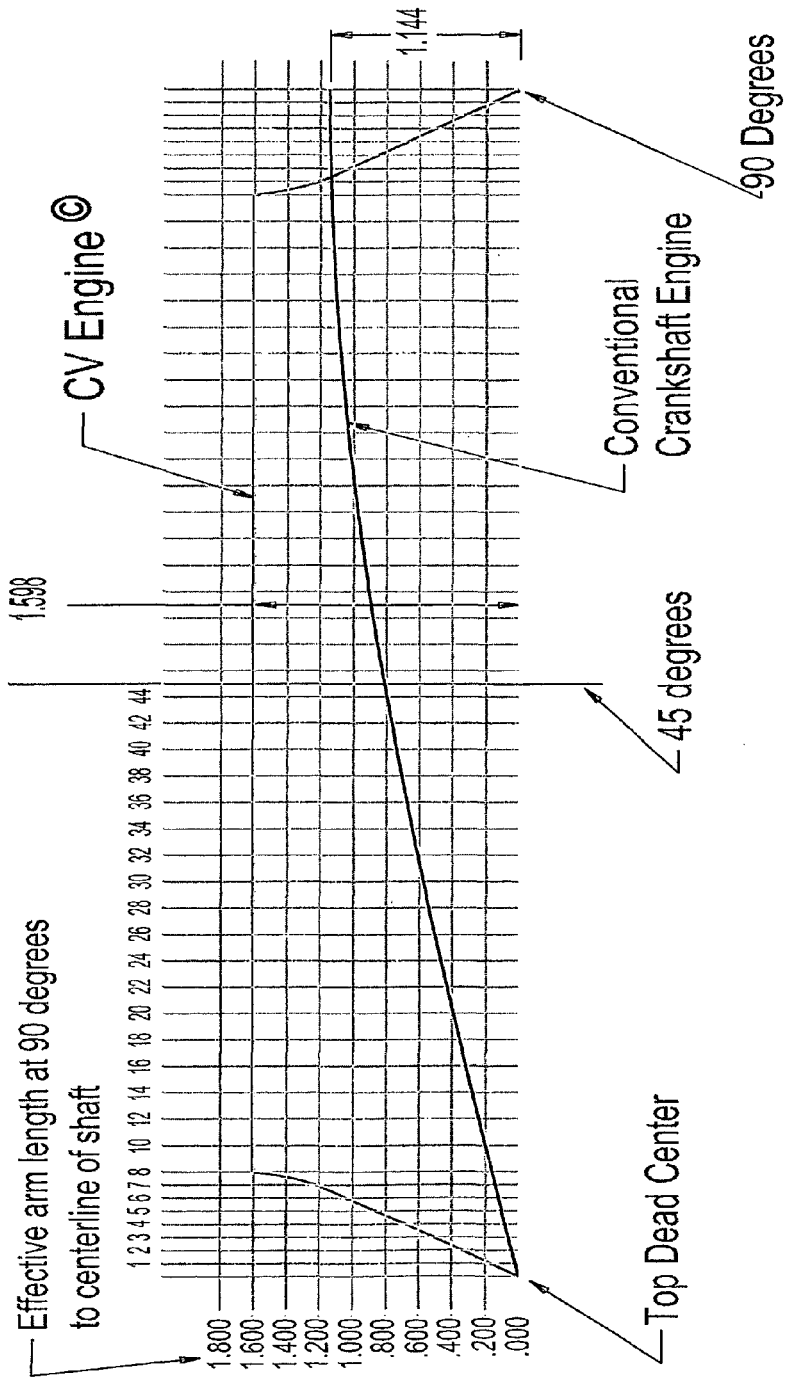

As viewed on the graph in FIG. 21, when comparing the conventional internal combustion engine with the constant velocity engine, it is apparent that the effectiveness of the constant velocity engine far surpasses the conventional engine. With both engines having equal amounts of applied pressure (100 psi), the constant velocity engine has nearly 243 in-lbs of torque greater than the conventional engine.

Conventional crankshaft engine average lever arm length at 90 degrees to centerline of force=0.741*=64.8% of maximum lever arm length of 1.144*. At 180 degrees of shaft rotation at 100 lbs of linear force to piston=average torque of 74.1 in lbs of torque there will be loss of torque due to piston to cylinder friction incurred from connecting rod angular pressures. This friction increases as force increases and resistance of shaft rotation is incurred.

Constant velocity engine lever arm length at 90 degrees to centerline of force=1.478*=92.5% of maximum lever arm length of 1.598*. At 180 degrees of shaft rotation at 100 lbs of linear force to piston=average torque of 147.8 in lbs of torque there is no to piston to cylinder friction incurred from connecting rod to angular pressures.

Incorporated in the design and depending on the constant velocity design's changeable bore to stroke and stroke to rotation, as earlier indicated, over twice as much torque to combustion is realized. Another design advantage of the constant velocity technology is less friction produced. One can deduce that less heat will be generated in the constant velocity engine because of the minimized friction. With less friction and less heat, the resulting advantage will also increase power and emit less environmental pollutants.

As hereinbefore indicated, when comparing the conventional engine with the constant velocity concept, both of equal displacement, the overall dimensions and configuration of the constant velocity engine are considerably smaller. The constant velocity design is very low in height and is compact in length; the width is similar to that of the conventional crankshaft engine but is generally less. The total results relate to less weight. Less weight means less expense to manufacture the moving vehicle and more economy in operating the mechanism thus achieving a greater advantage over the current conventional technology. When designed with the half speed shaft rotation, the torque is much greater and the transmission to the drive wheel ratio is decreased. The wheel speed to engine shaft rotation speed is decreased or closer to an even ratio than the conventional engine. Again, the constant velocity design creates more economical value for the overall vehicle.

One very unique advantage is the large hole through the center of the constant velocity engines' shaft. This allows for mutable engines to be coupled by a common shaft as needed to create the maximum power of the combined engines allowing any one or multiple engines to be employed or disconnected or rotated as desired. This will produce greater value in the overall engine with the flexibility to add, drop or rotate the engines at continued use even in reduced power. Also, in the event of mechanical failure to any one of the engines, one has access to utilize the other engines and maximize power as needed. Currently, manufacturers have versions of the original Cadillac 8-6-4 engine without the added benefits of the constant velocity technology. Chrysler's Multi-Displacement Systems (MDS), GM's Active Fuel Management (AFM), Honda's Variable Cylinder Management (VCM) and Mercedes Benz' Active Cylinder Control (ACC) all have engines which shuts down cylinders as the need decreases such as during highway driving. Chrysler expects the economy of this engine to be 10-20% more than the current V8 engines it has on the market. The constant velocity technology can take what the existing products have accomplished and take it to the next generation.

The constant velocity design also has the advantage of ability to use the back side of the piston. This can be used for the induction of fuel. In the 2-stroke version of the constant velocity engine, the chamber underneath the backside of the piston is sealed from the rest of the engine unit. Thus, lubrication is not present in this chamber and will result in a clean burn fuel. The 2-stroke engine is generally less efficient and pollutes more than the 4-stroke counterparts but it also produces much more power than the 4-stroke. In the early development of the conventional 2-stroke engine, the fuel to oil ratio was 15:1 meaning that for every 15 gallons of fuel burned in operating a weed-whacker or moped or any other 2-stroke engine, one gallon of oil was emitted into the atmosphere. Today, with the current use of high performance lubricants, this ratio has increased up to 50:1.

Since the constant velocity design does not have to contend with the lubricating oils found in the conventional engine, the pollutants should be less than or equal to than that of the 4-stroke cycle. Additionally, the constant velocity 2-stroke cycle should produce greater power, again producing a more efficient engine.

Another benefit of the constant velocity technology is that the back side piston in the constant velocity engine can also be used for additional combustion. This concept can be developed into a very high powered engine at an unprecedented compact size. The benefits of this are very explanatory.

As all of the movements of the units are designed with roller and/or ball bearings, the life expectancy will far surpass the conventional crankshaft type units.

As the engine is designed for its desired use, the combined advantage of less fuel consumption per power generated and more compact design with less emission of environmental pollutant will be evident in the overall benefit of the constant velocity technology as these advantages could realistically be twice the benefit or greater than that of the present crankshaft type engine.

The constant velocity engine is considered the engine of the future and thought to eventually replace all crankshaft combustion engines. Also, any applications that convert linear motion to rotary motion or rotary motion to linear motion are available.

The acceptance of the new constant velocity engine technology and the replacement of the crankshaft engine will be different for each industry. The industry decisions will consider what it will cost to change from old to new, mandated or demand need for better efficiency (mileage) and pollution reduction and the value of reduced cost to manufacture, extended engine life and weight reduction.

New tooling costs will be a consideration factor for all industries except those that purchase the complete engine as an OEM component. However, the licensee's tooling cost will be substantially lower due to the transfer of design technology and documentation.

Reduced cost to manufacture will be a consideration for all industries. Cost reduction comes from simplicity to fabricate, fewer parts and reduced weight. The licensee will gain this cost advantage early because of the transferred design technology and documentation.

Better efficiency will be a consideration for all industries. The increased efficiency comes from higher and more uniform torque transfer to the gear shaft, change of off-axis force vectors to linear-axis force vectors, increased displacement for equivalent stroke, reduced operating friction (heat), reduced weight and the built-in forced air/air fuel induction capability. The constant velocity concept will be able to achieve a much longer life for its lubrication oils. In fact, the design may eliminate the need for oil filters and oil changes. The lubrication oils will approach the lifetime of the engine. This alone is a multi-billion saving in dollars and environmental pollution.

Efficiency makes up a vast component of an engine's lifetime cost. For electric motors, the lifetime cost of energy is about 95%. This understanding is barely on the radar for consumer products but for industries such as rail, trucking, power generation and shipping, it means enormous savings.

Longer engine life will be a mixed market issue. The commercial engine market (rail, trucking, etc.) will especially want the increased engine life. The automotive and utility engine industries may see this as an issue of revenue losses but competition may force them to accept the benefit. The extended engine life comes from the unique reduction of internal friction, separation of the gear case oil from the combustion and wear area, lower operating rpm for equivalent power, ability to decouple unneeded cylinders, fewer moving parts and the opportunity to use new materials.

Weight reduction will be a consideration for all industries. Less weight means less cost, reduced volume or footprint and related efficiencies to a lesser or greater degree. Automobiles will benefit from all aspects since a lighter engine means the automobile is lighter overall. In shipping vessels, an engine with smaller volume, including fuel, directly translates into more cargo, thus more profit.

Lower pollution of 2-stroke engines using the constant velocity concept is a unique feature and a critical advantage for all industries that market the 2-stroke engine and must meet new EPA emission reduction standards. Unless they improve, they may be restricted from certain areas of use and markets or even prohibited from selling their product. Pollution reduction of the current crankshaft technology can only be accomplished at an increase in cost, complexity and size.

Other different applications of the constant velocity design are also apparent, for example in hydro drive generators and driven compressors/pumps.

Specifically, twenty percent of the world's electricity is currently produced by hydropower plants and there are over 2,000 hydropower plants in the United States, providing approximately 10% of our total electricity. Canada, Norway, and New Zealand are three countries that use hydroelectric power as their primary source of electricity generation. China has attained over 40% of their energy sources through hydropower. The world's hydropower plants output a combined total of 675,000 megawatts that produce the equivalent of over 2.3 trillion kilowatt-hours of electricity each year, the energy equivalent of 3.6 billion barrels of oil, reaching over one billion people, according to the National Renewable Energy Laboratory.

The traditional Hydro Drive Generator used today incorporates 5 components. These include a dam, turbine, generator and the transmission line. While the dam controls the flow of water and creates a reservoir. The water in the reservoir is put through the turbines and the force of falling water pushing against the turbine's blades causes the turbine to spin. The turbine converts the kinetic energy of falling water into mechanical energy. Connected to the turbine by shafts and possibly gears so when the turbine spins it causes the generator to spin also. This converts the mechanical energy from the turbine into electric energy. Generators in hydropower plants work just like the generators in other types of power plants. Transmission lines transfer electricity from the hydropower plant to homes and businesses. The volume of water flow and the height from the turbines in the power plant to the water surface created by the dam determines the quantity of electricity generated. Simply, the greater the flow and the taller the water falling means the more electricity produced.

In this configuration using the constant velocity technology, in lieu of traditional hydro turbine generators, consumption of water would be minimized but the power considerably greater. The existing hydra generators use great volume of water to spin the turbine at high speeds, creating generous amounts of energy. With the advantage of the constant velocity design, the consumption of water will be far less while the power produced per gallon of use would be much greater.

In a pumped storage plant, there are two reservoirs instead of one in which it utilizes of a reversible turbine. The plant can pump water from the second reservoir back to the upper reservoir or the first reservoir. This is done in off-peak hours. Essentially, the second reservoir refills the upper reservoir. By pumping water back to the upper reservoir, the plant has more water to generate electricity during periods of peak consumption. The use of the constant velocity technology in the reserve pump will once again promote more efficiency and economy for the world's hydropower plants.

Regarding driven compressor/pumps, in the design advantages of the constant velocity technology, the unit also functions as a gas or liquid pump. There are two varieties of pumps. One is the centrifugal pump which is used commonly in washing machines and dishwashers.

The other type of pump is the positive displacement pump system which functions by trapping a fixed amount of fluid and then forcing the trapped volume into the discharge pipe. As the design capabilities of the constant velocity technology can be changed, the unit has the advantage in the transfer of gas and/or liquid in low pressure/high volume to high pressure/low volume. The unit in all of the configurations will be very compact and very efficient.

While the invention has been descried in terms of various specific and preferred embodiments, the skilled artisan will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. A constant velocity, piston motion to gearshaft rotation, internal combustion engine/design which comprises a gearshaft member extending through at least one reciprocating rodrack assembly providing rotation of said gearshaft member, each said rodrack assembly comprising at least one pair of coaxial linearly opposing pistons and gearshaft teeth engaging means, said gearshaft member comprising a series of teeth arranged about the diameter thereof but offset as to provide engagement with a rodrack assembly in one direction and non-engagement in the opposite, said gearshaft member also comprising rodrack engagement reversing grooves and each said rodrack assembly also comprising engagement guide shafts, thus providing reversing points between the end of each stroke of the pistons and total engagement throughout the stroke and the reversing stroke of the pistons and defining means for converting linear motion to rotary motion or rotary motion to linear motion.

2. The constant velocity internal combustion engine/design as defined by claim 1, said rodrack assembly comprising offset rails providing teeth engagement with said gearshaft member and roller beams.

3. The constant velocity internal combustion engine/design as defined by claim 1, said gearshaft member comprising end sections provided with gearshaft flanges.

4. The constant velocity internal combustion engine/design as defined by claim 1, comprising piston assemblies mounted to said rodrack in a collinear position.

5. The constant velocity internal combustion engine/design as defined by claim 1, each end of said rodrack being connected to linkrods employing a turning cam axle.

6. The constant velocity internal combustion engine/design as defined by claim 1, the top and bottom of said rodrack having machined parallel surfaces which fit into bearings mounted to a casing therefor.

7. The constant velocity internal combustion engine/design as defined by claim 1, said gearshaft member having a central hole extending therethrough.

8. The constant velocity internal combustion engine/design as defined by claim 1, the centerlines of said pistons and said gearshaft being in the same plane.

9. The constant velocity internal combustion engine/design as defined by claim 1, two strokes of said pistons providing one revolution of said gearshaft member.

* * * * *